US009219518B1

(12) United States Patent
Chen et al.

(10) Patent No.: US 9,219,518 B1
(45) Date of Patent: Dec. 22, 2015

(54) RADIO FREQUENCY TRANCEIVER FRONT-END DEVICE

(71) Applicant: NATIONAL TAIWAN UNIVERSITY, Taipei (TW)

(72) Inventors: Huan-Sheng Chen, Taipei (TW); Li-Xuan Chuo, Taipei (TW); Liang-Hung Lu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 14/565,969

(22) Filed: Dec. 10, 2014

(30) Foreign Application Priority Data

Jul. 3, 2014 (TW) .............................. 103122999 A

(51) Int. Cl.
H04B 1/48 (2006.01)
H04B 1/401 (2015.01)

(52) U.S. Cl.
CPC . *H04B 1/401* (2013.01); *H04B 1/48* (2013.01)

(58) Field of Classification Search
CPC ......................................................... H04B 1/48
See application file for complete search history.

(56) References Cited

U.S. PATENT DOCUMENTS

| 9,031,517 B2 * | 5/2015 | Jerng | H04B 1/0458 455/78 |
| 2004/0033787 A1 * | 2/2004 | Weber | H04B 7/04 455/78 |
| 2005/0215205 A1 * | 9/2005 | Rofougaran | H04B 1/18 455/78 |
| 2007/0152904 A1 * | 7/2007 | Castaneda | H01Q 1/242 343/859 |
| 2008/0117894 A1 * | 5/2008 | McMorrow | H03F 3/217 370/359 |
| 2009/0289721 A1 * | 11/2009 | Rajendran | H03F 3/195 330/301 |
| 2010/0040178 A1 * | 2/2010 | Sutton | H04B 7/0845 375/345 |
| 2011/0068636 A1 * | 3/2011 | Lee | H03K 17/693 307/115 |
| 2011/0115565 A1 * | 5/2011 | Cabanillas | H03F 1/0277 330/307 |
| 2011/0222443 A1 * | 9/2011 | Khlat | H03F 3/189 370/277 |
| 2012/0129468 A1 * | 5/2012 | Maimon | H04B 1/0458 455/73 |
| 2012/0295559 A1 * | 11/2012 | Kwok | H04B 1/48 455/83 |

* cited by examiner

Primary Examiner — Nay A Maung
Assistant Examiner — Cindy Trandai
(74) Attorney, Agent, or Firm — Birch, Stewart, Kolasch & Birch, LLP

(57) ABSTRACT

In an RF transceiver front-end device that operates in a receiving mode, a first transformer circuit generates, based on an external RF signal received by an antenna, a first induction signal that passes through a switch unit, and that is amplified by a low noise amplifier circuit and then demodulated by a demodulation circuit to thereby generate a reception signal. When the RF transceiver front-end device is in a transmitting mode, a power amplifier circuit generates, based on a modulated signal generated by a modulation circuit through modulation of an external transmission signal, an amplified output. A second transformer circuit then generates, based on the amplified output, a second induction signal that is thus radiated by the antenna.

14 Claims, 6 Drawing Sheets

RADIO FREQUENCY TRANCEIVER FRONT-END DEVICE

CROSS-REFERENCE TO RELATED APPLICATION

This application claims priority of Taiwanese Application No. 103122999, filed on Jul. 3, 2014.

FIELD OF THE INVENTION

This invention relates to a front-end device, and more particularly to a radio frequency transceiver front-end device.

BACKGROUND OF THE INVENTION

FIG. 1 illustrates a conventional radio frequency (RF) transceiver front-end device that is operable in one of a receiving mode and a transmitting mode, and that includes an antenna 11, first and second impedance matching circuits 13, 14, a transceiver switch 12 coupled among the antenna 11 and the first and second impedance matching circuits 13, 14, first and second transformers 15, 16 coupled respectively to the first and second impedance matching circuits 13, 14, and an RF transceiver chip 17. The RF transceiver chip 17 includes a low noise amplifier (LNA) circuit 171 coupled to the first transformer 15, and a power amplifier circuit 172 coupled to the second transformer 16.

When the conventional RF transceiver front-end device is in the receiving mode, the transceiver switch 12 is switched to form a reception path between the antenna 11 and the first impedance matching circuit 13 such that an external first RF signal (Rfs) received by the antenna 11 can be transmitted to the first impedance matching circuit 13 through the reception path. The first impedance matching circuit 13 generates a first matching signal based on the first RF signal (Rfs), and outputs the first matching signal to the first transformer 15. The first transformer 15 generates a pair of differential first induction signals based on the first matching signal from the first impedance matching circuit 13. The LNA circuit 171 amplifies the differential first induction signals generated by the first transformer 15 to generate a pair of differential amplified signals.

When the conventional RF transceiver front-end device is in the transmitting mode, the transceiver switch 12 is switched to form a transmission path between the antenna 11 and the second impedance matching circuit 14. In this case, the power amplifier circuit 172 receives and amplifies a pair of differential input signals to generate a pair of differential output signals. The second transformer 16 generates a second induction signal based on the differential output signals from the power amplifier circuit 172. The second impedance matching circuit 14 generates, based on the second induction signal from the second transformer 16, a second matching signal that is transmitted to the antenna 11 through the transmission path and that is then radiated by the antenna 11 to serve as a second RF signal (Rfs').

In such a configuration, ideally, when in the receiving mode, the first impedance matching circuit 13 and the first transformer 15 are used to provide impedance matching between the antenna 11 and the RF transceiver chip 17, and when in the transmitting mode, the second impedance matching circuit 14 and the second transformer 16 are used to provide impedance matching between the RF transceiver chip 17 and the antenna 11, making the first and second impedance matching circuits 13, 14 both essential for the conventional RF transceiver front-end device. However, it is noted that the first and second matching circuits 13, 14 are generally composed of inductors and/or capacitors leading to a relatively larger circuit area and a greater manufacturing cost.

SUMMARY OF THE INVENTION

Therefore, an object of the present invention is to provide a radio frequency transceiver front-end device that can overcome at least one of the aforesaid drawbacks associated with the prior art.

According to this invention, a radio frequency (RF) transceiver front-end device is adapted to receive, in a receiving mode, an external first RF signal so as to generate a reception signal, and to receive, in a transmitting mode, an external transmission signal so as to radiate a second RF signal. The RF transceiver front-end device of this invention comprises:

an antenna used to receive the first RF signal and to radiate the second RF signal;

a first transformer circuit coupled to the antenna, and operable to generate a first induction signal based at least on the first RF signal received by the antenna when the RF transceiver front-end device is in the receiving mode;

a low noise amplifier (LNA) circuit;

a first switch unit coupled between the first transformer circuit and the LNA circuit, and operable to transmit the first induction signal from the first transformer circuit to the LNA circuit when the RF transceiver front-end device is in the receiving mode, such that the LNA circuit amplifies the first induction signal to generate an amplified signal;

a demodulation circuit coupled to the LNA circuit for receiving the amplified signal therefrom, and demodulating the amplified signal to generate the reception signal;

a modulation circuit used to receive and modulate the transmission signal so as to generate a modulated signal;

a power amplifier circuit coupled to the modulation circuit for receiving the modulated signal therefrom, the power amplifier circuit being operable to amplify power of the modulated signal so as to generate an amplified output when the RF transceiver front-end device is in the transmitting mode; and a second transformer circuit coupled between the power amplifier circuit and the first transformer circuit, and receiving the amplified output from the power amplifier circuit, the second transformer circuit being operable to generate a second induction signal based at least on the amplified output and outputting the second induction signal to the first transformer circuit when said RF transceiver front-end device is in the transmitting mode.

When the RF transceiver front-end device is in the transmitting mode, the first transformer circuit transmits the second induction signal from the second transformer circuit to the antenna such that the second induction signal is radiated by the antenna to serve as the second RF signal.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
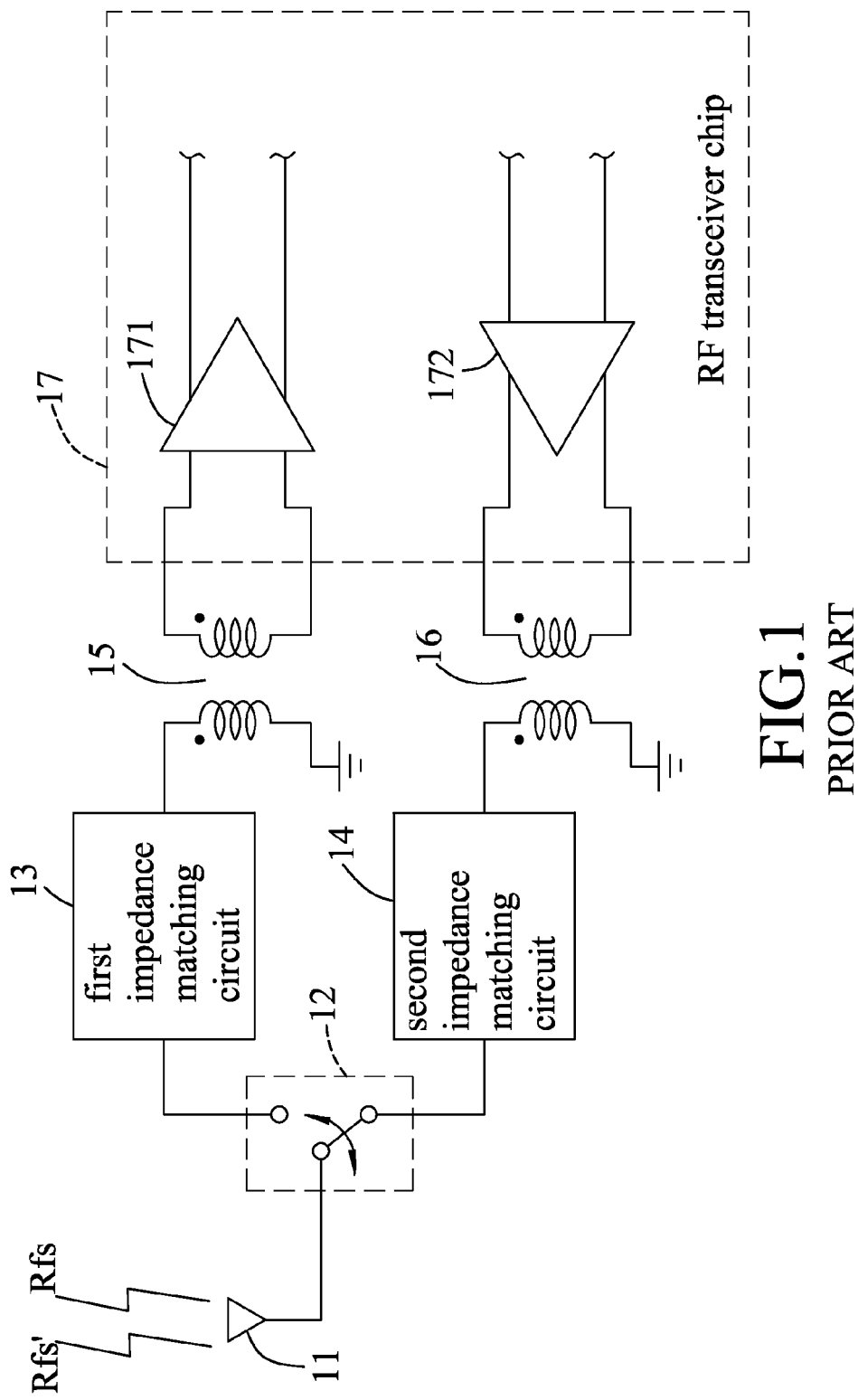
FIG. 1 is a schematic electrical circuit block diagram illustrating a conventional radio frequency front-end device.

Before the present invention is described in greater detail with reference to the accompanying embodiments, it should be noted herein that like elements are denoted by the same reference numerals throughout this disclosure. In addition, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 2:
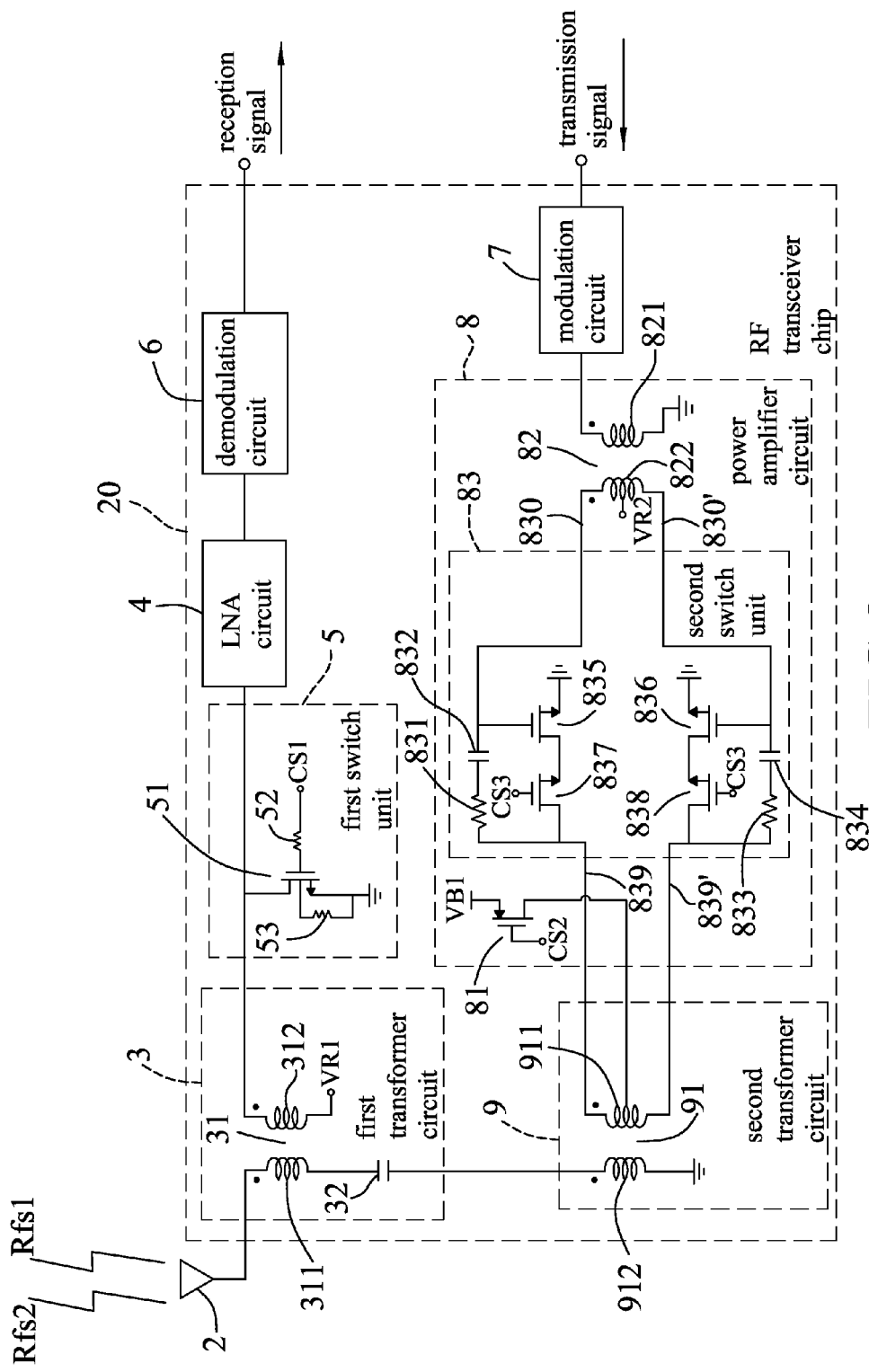
FIG. 2 is a schematic electrical circuit block diagram illustrating the first embodiment of a radio frequency (RF) transceiver front-end device according to the present invention.

Referring to FIG. 2, the first embodiment of a radio frequency (RF) transceiver front-end device according to the present invention is shown to receive, in a receiving mode, an external first RF signal (Rfs1) so as to generate a reception signal, and to receive, in a transmitting mode, an external transmission signal so as to radiate a second RF signal (Rfs2). The RF transceiver front-end device includes an antenna 2, a first transformer circuit 3, a low noise amplifier (LNA) circuit 4, a first switch unit 5, a demodulation circuit 6, a modulation circuit 7, a power amplifier circuit 8 and a second transformer circuit 9. It is noted that the first transformer circuit 3, the LNA circuit 4, the first switch unit 5, the demodulation circuit 6, the modulation circuit 7, the power amplifier circuit 8 and the second transformer circuit 9 are integrated into a single chip (thereinafter called an RF transceiver chip 20).

The antenna 2 is used to receive the first RF signal (Rfs1) and to radiate the second RF signal (Rfs2).

In this embodiment, the first transformer circuit 3 includes a first transformer 31. The first transformer 31 has a primary winding 311 and a secondary winding 312, each of which has a dotted end and a non-dotted end opposite to the dotted end. The dotted end of the primary winding 311 is coupled to the antenna 2 for receiving the first RF signal (Rfs1) therefrom. The non-dotted end of the secondary winding 312 is used to receive an external variable first reference voltage (VR1). Preferably, the first transformer circuit 3 further includes a capacitor 32 that is coupled between the non-dotted end of the primary winding 311 of the first transformer 31 and the second transformer circuit 9 for impedance matching. However, in other embodiments of this invention, the capacitor 32 may be omitted by adopting different impedance matching schemes for the RF transceiver chip 20. The first transformer circuit 3 is operable to generate a first induction signal based on the first RF signal (Rfs1) and the first reference voltage (VR1) when the RF transceiver front-end device is in the receiving mode.

In operation of the first transformer circuit 3, when the RF transceiver front-end device is in the receiving mode, the magnitude of the first reference voltage (VR1) is greater than zero such that the secondary winding 312 of the first transformer 31 generates the first induction signal at the dotted end thereof based on the first reference voltage (VR1) and the first RF signal (Rfs1). When the RF transceiver front-end device is in the transmitting mode, the magnitude of the first reference voltage (VR1) is zero.

The first switch unit 5 is coupled between the first transformer circuit 3 and the LNA circuit 4, and is operable to transmit the first induction signal from the first transformer circuit 3 to the LNA circuit 4. In this embodiment, the first switch unit 5 includes a first transistor 51, a first resistor 52 and a second resistor 53. The first transistor 51, such as an N-type metal-oxide-semiconductor field effect transistor (MOSFET), is coupled between the dotted end of the secondary winding 312 of the first transformer 31 and ground, and has a control terminal and a substrate terminal. The first resistor 52 has opposite terminals, one of which is coupled to the control terminal of the first transistor 51, and the other one of which is used to receive a first control signal (CS1). The first transistor 51 is operable to be conducting or non-conducting in response to the first control signal (CS1). The second resistor 53 is coupled between the substrate terminal of the first transistor 51 and ground. It is noted that, in other embodiments, the first and second resistors 52, 53 may be omitted.

In operation of the first switch unit 5, when the RF transceiver front-end device is in the receiving mode, the first transistor 51 is non-conducting, such that the first induction signal is transmitted from the dotted end of the secondary winding 312 of the first transformer 31 to the LNA circuit 4. When the RF transceiver front-end device is in the transmitting mode, the first transistor 51 is conducting, such that the dotted end of the secondary winding 312 of the first transformer 31 is grounded.

The LNA circuit 4 amplifies the first induction signal from the first switch unit 5 to generate an amplified signal when the RF transceiver front-end device is in the receiving mode. It should be noted that the LNA circuit 4 may be a single-ended LNA circuit, or alternatively, a double-ended LNA circuit.

The demodulation circuit 6 is coupled to the LNA circuit 4 for receiving the amplified signal therefrom, and demodulates the amplified signal to generate the reception signal.

The modulation circuit 7 is used to receive and modulate the transmission signal so as to generate a modulated signal.

Since the feature of this invention does not reside in the configurations of the LNA circuit 4, the modulation circuit 6 and the demodulation circuit 7, which are known to those skilled in the art, details of the same are omitted herein for the sake of brevity.

The power amplifier circuit 8 is coupled to the modulation circuit 7 for receiving the modulated signal therefrom. The power amplifier circuit 8 is operable to amplify power of the modulated signal so as to generate an amplified output when the RF transceiver front-end device is in the transmitting mode.

The second transformer circuit 9 is coupled between the power amplifier circuit 8 and the first transformer circuit 3, and receives the amplified output from the power amplifier circuit 8. The second transformer circuit 9 is operable to generate a second induction signal based at least on the amplified output, and outputs the second induction signal to the first transformer circuit 3 when the RF transceiver front-end device is in the transmitting mode. Thus, the second induction signal is transmitted to the antenna 2 through the capacitor 32 and the primary winding 311 of the first transformer 31 such that the second induction signal is radiated by the antenna 2 to serve as the second RF signal (Rfs2).

In this embodiment, the second transformer circuit 9 includes a second transformer 91. The second transformer 91 has a primary winding 911 that has a dotted end, a non-dotted end and an intermediate tap, and a secondary winding 912 that has a dotted end coupled to the capacitor 32 of the first transformer circuit 3, and a grounded non-dotted end.

In this embodiment, the power amplifying circuit 8 generates the amplified output based on the modulated signal from the modulation circuit 7, on external second and third control signals (CS2, CS3) and on an external second reference voltage (VR2). The power amplifier circuit 8 includes a second transistor 81, a third transformer 82 and a second switch unit 83. The second transistor 81 has a first terminal that is used to receive an external bias voltage (VB1), a second terminal that is coupled to the intermediate tap of the primary winding 911 of the second transformer 91, and a control terminal that is used to receive the second control signal (CS2) such that the second transistor 81 is operable to be conducting or non-conducting in response to the second control signal (CS2). For example, the second transistor 81 is a P-type MOSFET whose source, drain and gate serve respectively as the first, second and control terminals.

The third transformer 82 has a primary winding 821 and a secondary winding 822. The primary winding 821 of the third transformer 82 has a dotted end that is coupled to the modulation circuit 7 for receiving the modulated signal therefrom, and a grounded non-dotted end. The secondary winding 822 of the third transformer 82 has a dotted end, a non-dotted end, and an intermediate tap used to receive the second reference voltage (VR2). The third transformer 82 is operable to generate, based on the modulated signal and on the second reference voltage (VR2), a positive phase induction signal at the dotted end of the secondary winding 822, and a negative phase induction signal at the non-dotted end of the secondary winding 822. In this case, the positive phase induction signal and the negative phase induction signal serve as a pair of differential output signals.

The second switch unit 83 has a first input end 830 and a second input end 830' that are coupled respectively to the dotted and non-dotted ends of the secondary winding 822 of the third transformer 82 for receiving the positive and negative phase induction signals respectively therefrom, and a first output end 839 and a second output end 839' that are coupled respectively to the dotted and non-dotted ends of the primary winding 911 of the second transformer 91. The second switch unit 83 includes a first resistor 831, a first capacitor 832, a second resistor 833, a second capacitor 834, and third to six transistors 835~838. The first resistor 831 and the first capacitor 832 are coupled in series with each other and respectively to the first output end 839 and the first input end 830. The second resistor 833 and the second capacitor 834 are coupled in series with each other and respectively to the second output end 839' and the second input end 830'. The third and fifth transistors 835, 837 are coupled in series with each other and respectively to ground and the first output end 839. The fourth and sixth transistors 836, 838 are coupled in series with each other and respectively to ground and the second output end 839'. Each of the third to sixth transistors 835~838 has a control terminal. The control terminals of the third and fourth transistors 835, 836 are coupled respectively to the first and second input ends 830, 830'. The control terminals of the fourth and sixth transistors 837, 838 are used to receive the third control signal (CS3) such that the fifth and sixth transistors 837, 838 are operable to be conducting or non-conducting in response to the third control signal (CS3). In this embodiment, each of the third to six transistors 835~838 is, but not limited to, an N-type MOSFET.

In operation, when the RF transceiver front-end device is in the receiving mode, the second transistor 81 does not conduct in response to the second control signal (CS2) such that the intermediate tap of the primary winding 911 of the second transformer 91 is floating. At the same time, the second switch unit 83 of the power amplifier circuit 8 operates, based on the second reference voltage (VR2) and the third control signal (CS3), in a low impedance state, where the third and fourth transistors 835, 836 are each driven by the second reference voltage (VR2) to operate in a linear region while the fifth and sixth transistors 837, 838 are each driven by the third control signal (CS3) to operate in a linear region such that the first and second output ends 839, 839' are grounded. As a result, no current flows through the primary winding 911 of the second transformer 91. When the RF transceiver front-end device is in the transmitting mode, the second transistor 81 conducts in response to the second control signal (CS2) such that the bias voltage (VB1) is applied to the intermediate tap of the primary winding 911 of the second transformer 91. At the same time, the second switch unit 83 operates, based on the third control signal (CS3) and the positive and negative phase induction signals, in a high impedance state, where the third and fourth transistors 835, 836 are driven respectively by the positive and negative phase induction signals to each operate in a saturation region while the fifth and sixth transistors 837, 838 are each driven by the third control signal (CS3) to operate in a saturation region, to cause a positive phase output signal and a negative phase output signal to be outputted respectively at the second and first output ends 839', 839. In this case, the positive and negative phase output signals cooperatively constitute the amplified output. Thus, the second transformer 91 generates, based on the positive and negative phase output signals and the bias voltage (VB1), the second induction signal at the dotted end of the secondary winding 912 thereof. Then, the first transformer circuit 3 transmits the second induction signal from the second transformer 91 to the antenna 2 through the capacitor 32 and the primary winding 311 of the first transformer 31 such that the second induction signal is radiated by the antenna 2 to serve as the second RF signal (Rfs2).

Figure 6:
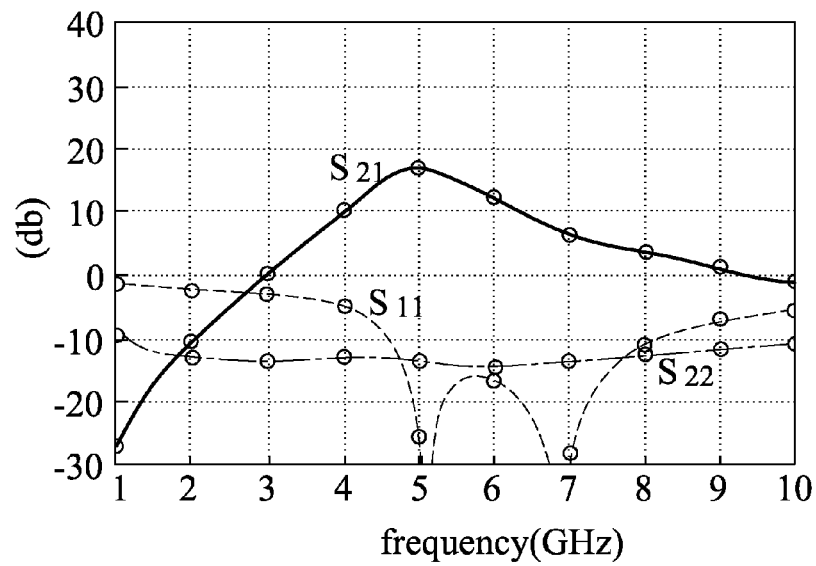
FIG. 6 is a plot illustrating experimental measurement results of a reception signal gain, an output return loss and an input return loss of the first embodiment when in a receiving mode.

FIG. 6 illustrates experimental measurement results of this embodiment when in the receiving mode, in which: the solid curve represents a reception signal gain ($S_{21}$), which is a ratio of the amplified signal generated by the LNA circuit 4 to the first RF signal (Rfs1); the long-dash-short-dash curve represents an output return loss ($S_{22}$) of the amplified signal; and the dashed curve represents an input return loss ($S_{11}$) of the first RF signal (Rfs1). From the experimental measurement results of FIG. 6, at a frequency of approximately 5 GHz where the reception signal gain ($S_{21}$) reaches its maximum, the output return loss ($S_{22}$) and the input return loss ($S_{11}$) are less than −10 dB. Therefore, the RF transceiver front-end device of this invention can achieve adequate impedance matching between the antenna 2 and the LNA circuit 4 when in the receiving mode.

Figure 7:
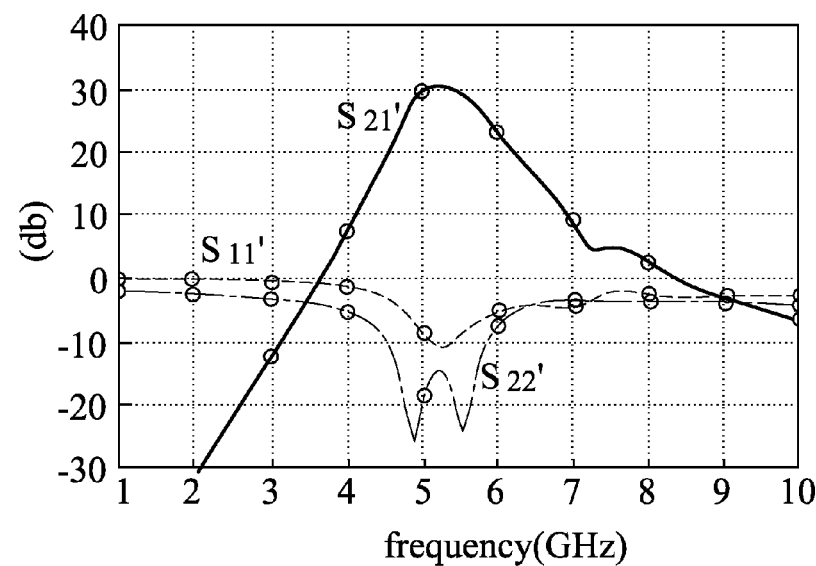
FIG. 7 is a plot illustrating experimental measurement results of a transmission signal gain, an output return loss and an input return loss of the first embodiment when in a transmitting mode.

FIG. 7 illustrates experimental measurement results of the embodiment when in the transmitting mode, in which: the solid curve represents a transmission signal gain ($S_{21}'$), which is a ratio of the second RF signal (Rfs2) to the modulated signal from the modulation circuit 7; the long-dash-short-dash curve represents an output return loss ($S_{22}'$) of the second RF signal (Rfs2); and the dashed curve represents an input return loss ($S_{11}'$) of the modulated signal. From the experimental measurements results of FIG. 7, at the frequency of a bit over 5 GHz where the transmission signal gain ($S_{21}'$) reaches its maximum, the output return loss ($S_{22}'$) and the input return loss ($S_{11}'$) are less than −10 dB. Therefore, the RF transceiver front-end device of this invention can achieve adequate impedance matching between the antenna 2 and the power amplifier circuit 8 when in the transmitting mode.

Figure 3:
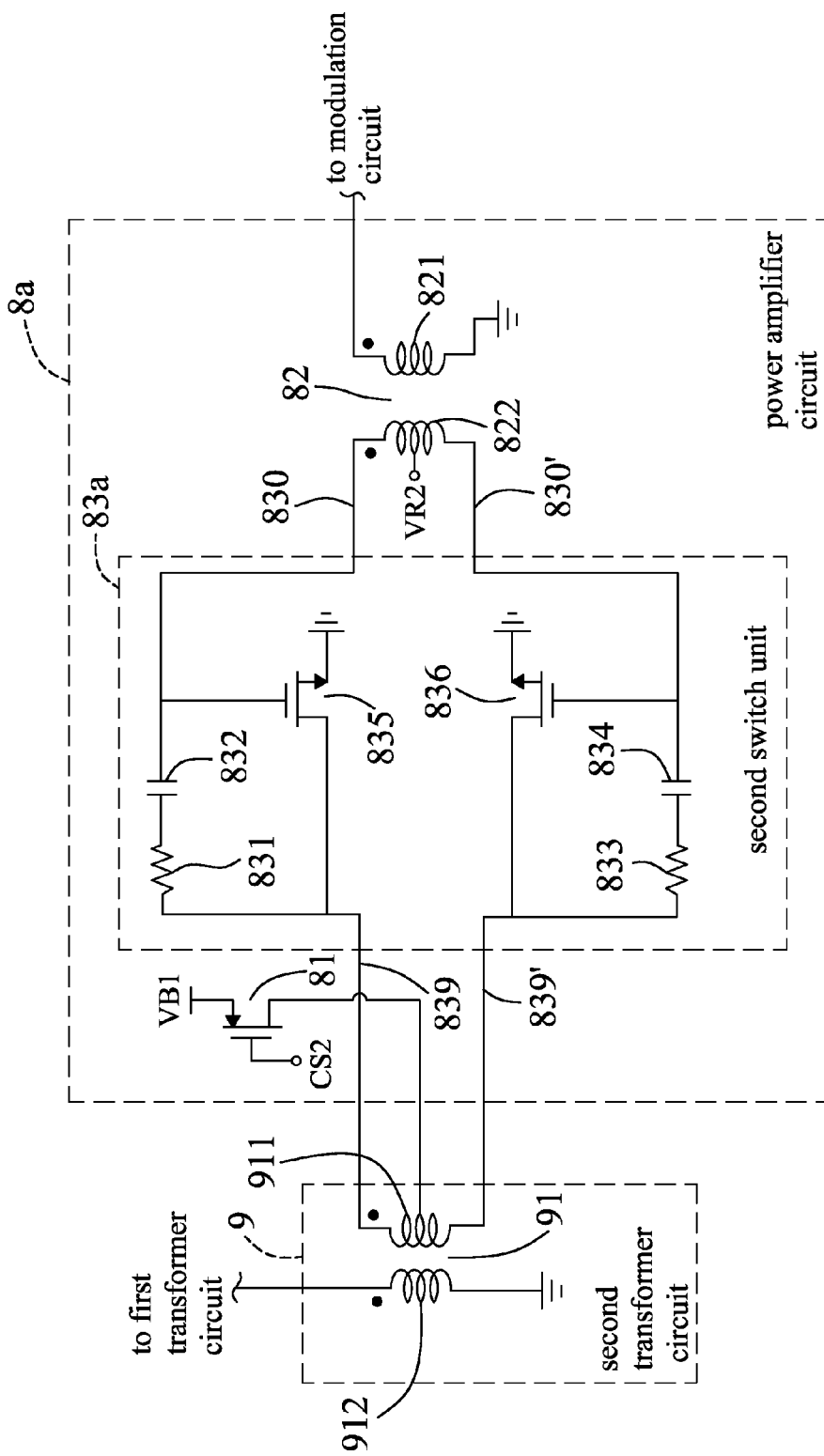
FIG. 3 is a schematic electrical circuit diagram illustrating a second transformer circuit and a power amplifier circuit of the second embodiment of an RF transceiver front-end device according to the present invention.

FIG. 3 illustrates a second transformer circuit 9 and a power amplifier circuit (8a) of the second embodiment of an RF transceiver front-end device according to the present invention, which is a modification of the first embodiment. Unlike the first embodiment, the second switch unit (83a) of the power amplifier circuit (8a) omits the fifth and sixth transistors 837, 838 of the second switch unit 83 of FIG. 2. As a result, the third transistor 835 is coupled directly to the first output end 839, and the fourth transistor 836 is coupled directly to the second output end 839'.

Figure 4:
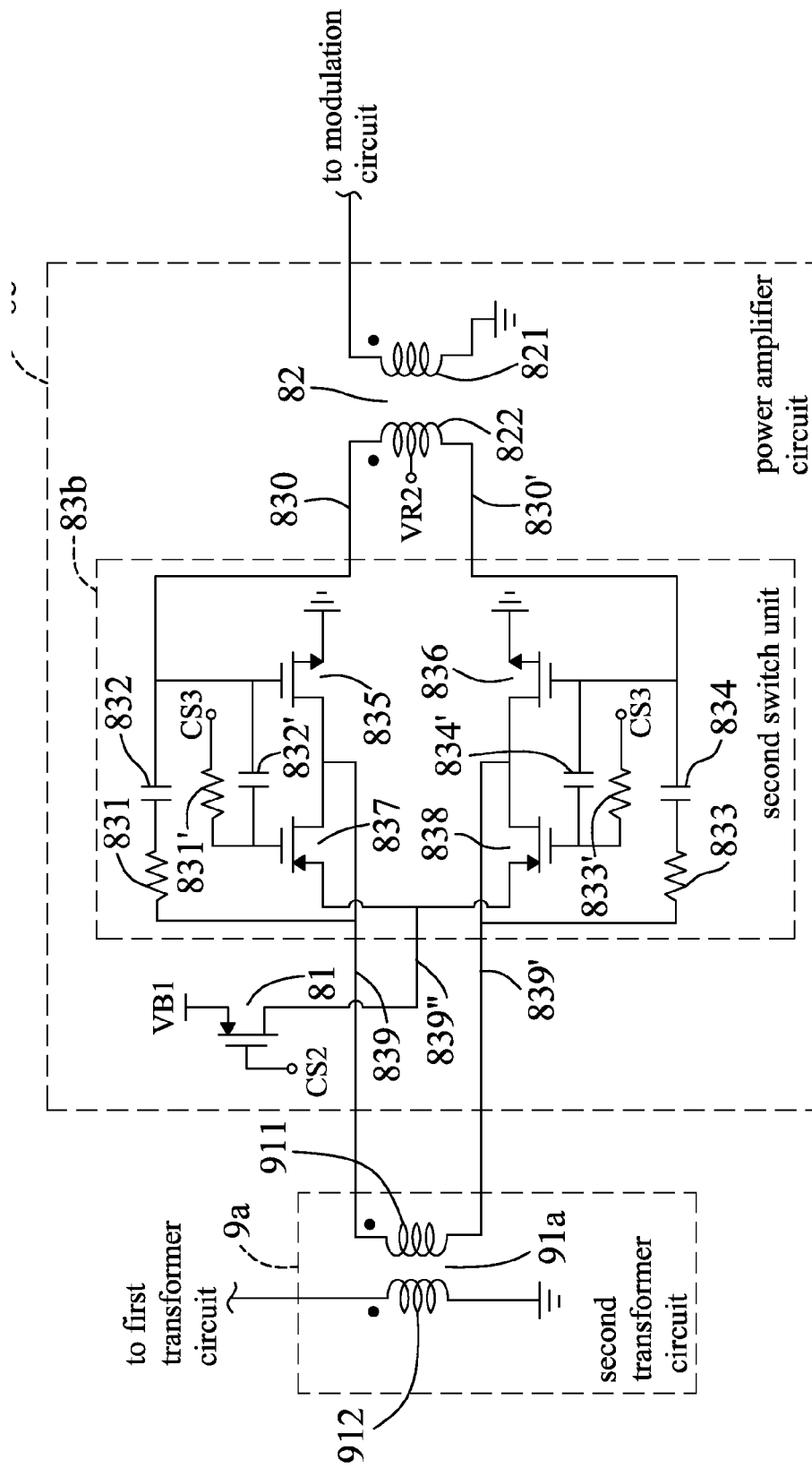
FIG. 4 is a schematic electrical circuit diagram illustrating a second transformer circuit and a power amplifier circuit of the third embodiment of an RF transceiver front-end device according to the present invention.

FIG. 4 illustrates a power amplifier circuit (8b) and a second transformer circuit (9a) of the third embodiment of an RF transceiver front-end device according to the present invention, which is a modification of the first embodiment. In this embodiment, the intermediate tap of the primary winding 911 of the second transformer (9a) of FIG. 2 is omitted in the second transformer (91a) of the second transformer circuit (9a).

Furthermore, the power amplifier circuit (8b) of the third embodiment differs from that of FIG. 2 in that the second switch unit (83b) further has a control end 839" coupled to the second terminal (drain) of the second transistor 81, and further includes a third resistor 831', a third capacitor 832', a fourth resistor 833' and a fourth capacitor 834'. In addition, in this embodiment, each of the third and fourth transistors 835, 836 is an N-type MOSFET while each of the fifth and sixth transistors 837, 838 is a P-type MOSFET.

In this embodiment, the third transistor 835 is coupled between the first output end 839 of the second switch unit (83b) and ground, and more specifically, a drain and a source of the third transistor 835 are coupled respectively to the first output end 839 and ground. The fifth transistor 837 is coupled between the first output end 839 and the control end 839" of the second switch unit (83b), and more specifically, a drain and a source of the fifth transistor 837 are coupled respectively to the first output end 839 and the control end 839". Similar to the third and fifth transistors 835, 837, the fourth transistor 836 is coupled between the second output end 839' of the second switch unit (83b) and ground, and more specifically, a drain and a source of the fourth transistor 836 are coupled respectively to the second output end 839' and ground, while the sixth transistor 838 is coupled between the second output end 839' and the control end 839" of the second switch unit (83b), and more specifically, a drain and a source of the sixth transistor 838 are coupled respectively to the second output end 839' and the control end 839".

The third resistor 831' has opposite terminals, one of which is coupled to the control terminal of the fifth transistor 837, and the other of which is used to receive the third control signal (CS3) such that the third control signal (CS3) is transmitted to the control terminal of the fifth transistor 837 through the third resistor 831'. Similar to the third resistor 831', the fourth resistor 833' has opposite terminals, one of which is coupled to the control terminal of the sixth transistor 838, and the other of which is used to receive the third control signal (CS3) such that the third control signal (CS3) is transmitted to the control terminal of the sixth transistor 838 through the fourth resistor 833'. The third capacitor 832' is coupled between the control terminals of the third and fifth transistors 835, 837. The fourth capacitor 834' is coupled between the control terminals of the fourth and sixth transistors 836, 838.

The second transformer (91a) and the power amplifier circuit (8b) of the third embodiment have similar operations as those of the first embodiment. In detail, when the second switch unit (83b) is in the low impedance state, the second transistor 81 is non-conducting in response to the second control signal (CS2) such that the control end 839" of the second switch unit (83b) is floating. At the same time, the third and fourth transistors 835, 836 are each driven by the second reference voltage (VR2) to operate in a linear region while the fifth and sixth transistors 837, 838 are each driven by the third control signal (CS3) to operate in a linear region. As a result, the first and second output ends 839, 839' of the second switch unit (83b) are grounded, and no current flows through the secondary winding 911 of the second transformer (91a). When the second switch unit (83b) is in the high impedance state, the second transistor 81 conducts in response to the second control signal (CS2) such that the bias voltage (VB1) is applied to the control end 839" of the second switch unit (83b). At the same time, the third and fourth transistors 835, 836 are driven respectively by the positive and negative phase induction signals to each operate in a saturation region while the fifth and sixth transistors are each driven by the third control signal (CS3) to operate in a saturation region, thereby causing the positive and negative phase output signals to be outputted respectively at the second and first output ends 839', 839.

Figure 5:
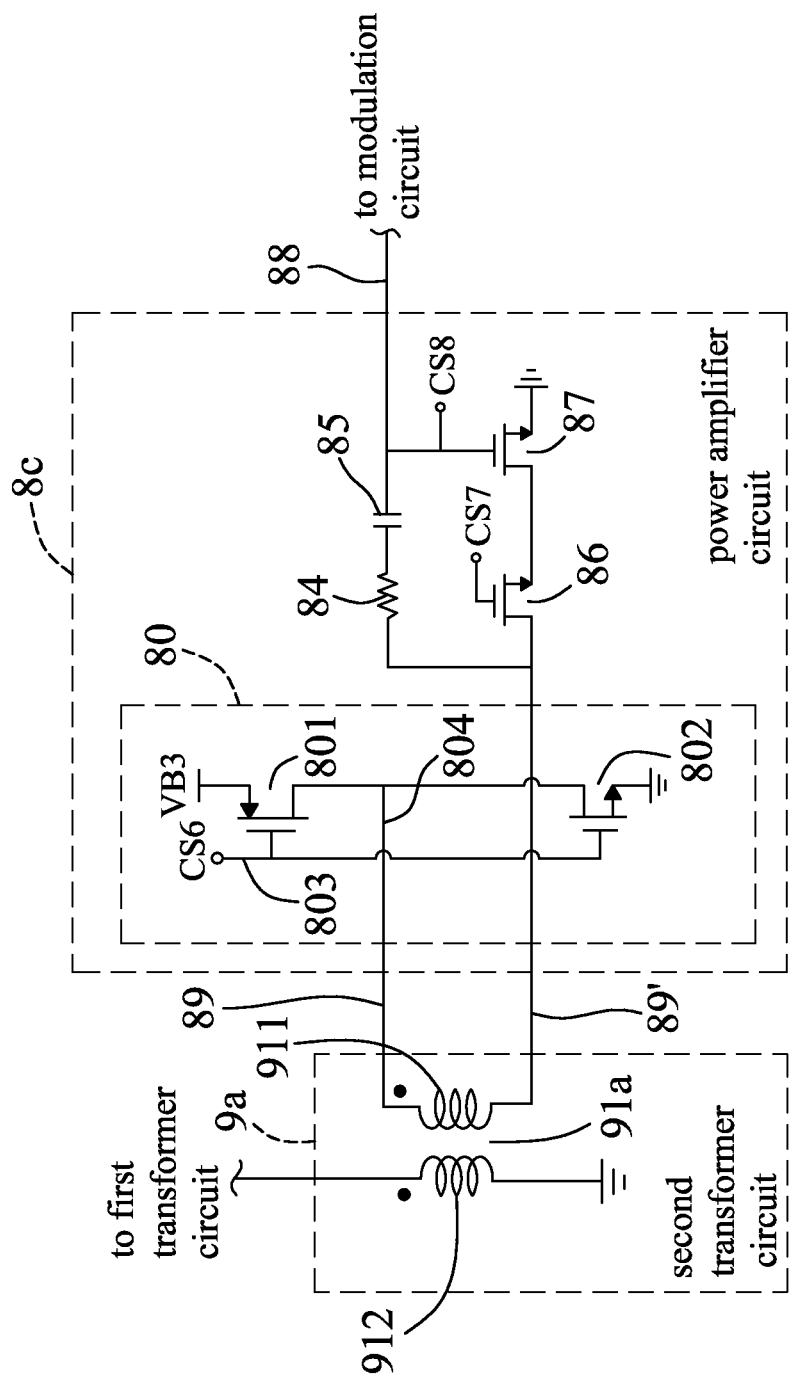
FIG. 5 is a schematic electrical circuit diagram illustrating a second transformer circuit and a power amplifier circuit of the fourth embodiment of an RF transceiver front-end device according to the present invention.

FIG. 5 illustrates a second transformer circuit (9a) and a power amplifier circuit (8c) of the fourth embodiment of an RF transceiver front-end device according to the present invention, which is a modification of the third embodiment. Unlike the third embodiment, the power amplifier circuit (8c) has an input end 88 coupled to the modulation circuit (not shown in the drawing) for receiving the modulated signal therefrom, and a first output end 89 and a second output end 89' that are coupled respectively to the dotted and non-dotted ends of the primary winding 911 of the second transformer (91a). The power amplifier circuit (8a) includes a complementary metal-oxide-semiconductor (CMOS) circuit 80, a resistor 84, a capacitor 85, a second transistor 86 and a third transistor 87. For example, each of the second and third transistors 86, 87 may be an N-type MOSFET.

The CMOS circuit 80 has an input node 803 that is used to receive a second control signal (CS6), and an output node 804 that is coupled to the first output end 89. The CMOS circuit 80 is operable to generate an output voltage at the output node 804 in response to the second control signal (CS6). In this embodiment, the CMOS circuit 80 includes a P-type MOSFET 801 and an N-type MOSFET 802, each of which has a source, a drain and a gate. The gates of the P-type MOSFET 801 and the N-type MOSFET 802 are coupled to the input node 803. The drains of the P-type MOSFET 801 and the N-type MOSFET 802 are coupled to the output node 804. The source of the P-type MOSFET 801 is used to receive an external bias voltage (VB3). The source of the N-type MOSFET 802 is grounded. The resistor 84 and the capacitor 85 are coupled in series with each other and respectively to the second output end 89' and the input end 88. The second and third transistors 86, 87 are coupled in series with other and respectively to the second output end 89' and ground. The second transistor 86 has a control terminal used to receive an external third control signal (CS7) such that the second transistor 86 is operable to be conducting or non-conducting in response to the third control signal (CS7). The third transistor 87 has a control terminal that is coupled to the input end 88 for receiving the modulated signal from the modulation circuit (not shown in the drawing) and that is used to further receive an external fourth control signal (CS8).

In operation, when the RF transceiver front-end device is in the receiving mode, the power amplifier circuit (8c) operates, based on the second, third and fourth control signals (CS6, CS7, CS8), in a low impedance state, where the output voltage outputted at the output node 804 of the CMOS circuit 80 is zero in response to the second control signal (CS6) (i.e., the output node 804 of the CMOS circuit 80 is grounded) while the second and third transistors 86, 87 are driven respectively by the third and fourth control signals (CS7, CS8) to each operate in a linear region such that the second output end is grounded. As a result, no current flows through the primary winding 911 of the second transformer (91a). When the RF transceiver front-end device is in the transmitting mode, the power amplifier circuit (8c) operates, based on the second and third control signals (CS6, CS7) and the modulated signal, in a high impedance state, where the output voltage outputted at the output node 804 of the CMOS circuit 80 is the bias voltage (VB3), which is greater than zero, in response to the second control signal (CS6), such that the bias voltage (VB3) is outputted at the first output end 89 while the second and third transistors 86, 87 are driven respectively by the third control signal (CS7) and the modulated signal to each operate in a saturation region. As a result, the amplified output is outputted at the second output end 89'.

In summary, when the RF transceiver front-end device is in the receiving mode, the first switch unit 5 serves as a transceiver switch for providing a reception path while the power amplifier circuit 8, (8a), (8b), (8c) operates to ground the dotted and non-dotted ends of the primary winding 911 of the second transformer 91, (91a), so that, ideally, the equivalent impedance of the secondary winding 912 of the second transformer 91, (91a) may be regarded as zero. In this case, the first transformer circuit 3 and the first switch unit 5 are employed to achieve impedance matching between the LNA circuit 4 and the antenna 2 without the need for the first impedance matching circuit 13 in the prior art (see FIG. 1). When the RF transceiver front-end device is in the transmitting mode, the first switch unit 5 cooperates with the first reference voltage (VR1) being zero to ground the dotted and non-dotted ends of the secondary winding 312 of the first transformer 31, so that, ideally, the equivalent impedance of the primary winding 311 of the first transformer 31 may be regarded as zero. In this case, the capacitor 32 of the first transformer circuit 3 and the second transformer circuit 9 are used to achieve impedance matching between the antenna 2 and the power amplifier circuit 8, (8a), (8b), (8c) without the need for the second impedance matching circuit 14 in the prior art (see FIG. 1).

Since the first and second impedance matching circuits 13, 14 required in the prior art (see FIG. 1) can be omitted in the RF transceiver front-end device of this invention and since the first switch unit 5, the second switch unit 83, (83a), (83b) of the power amplifier circuit 8, (8a), (8b) and the power amplifier circuit (8c) have relatively simple circuit configurations suitable for being integrated into the RF transceiver chip 20 (see FIG. 2), the RF transceiver front-end device of this invention has a relatively small circuit area and a lower manufacturing cost compared to the aforementioned conventional RF transceiver front-end device.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A radio frequency (RF) transceiver front-end device adapted to receive, in a receiving mode, an external first RF signal so as to generate a reception signal, and to receive, in a transmitting mode, an external transmission signal so as to radiate a second RF signal, said RF transceiver front-end device comprising:
    an antenna used to receive the first RF signal and to radiate the second RF signal;
    a first transformer circuit coupled to said antenna, and operable to generate a first induction signal based at least on the first RF signal received by said antenna when said RF transceiver front-end device is in the receiving mode;
    a low noise amplifier (LNA) circuit;
    a first switch unit coupled between said first transformer circuit and said LNA circuit, and operable to transmit the first induction signal from said first transformer circuit to said LNA circuit when said RF transceiver front-end device is in the receiving mode, such that said LNA circuit amplifies the first induction signal to generate an amplified signal;
    a demodulation circuit coupled to said LNA circuit for receiving the amplified signal therefrom, and demodulating the amplified signal to generate the reception signal;
    a modulation circuit used to receive and modulate the transmission signal so as to generate a modulated signal;
    a power amplifier circuit coupled to said modulation circuit for receiving the modulated signal therefrom, said power amplifier circuit being operable to amplify power of the modulated signal so as to generate an amplified output when said RF transceiver front-end device is in the transmitting mode; and
    a second transformer circuit coupled between said power amplifier circuit and said first transformer circuit, and receiving the amplified output from said power amplifier circuit, said second transformer circuit being operable to generate a second induction signal based at least on the amplified output and outputting the second induction signal to said first transformer circuit when said RF transceiver front-end device is in the transmitting mode;
    wherein, when said RF transceiver front-end device is in the transmitting mode, said first transformer circuit transmits the second induction signal from said second transformer circuit to said antenna such that the second induction signal is radiated by said antenna to serve as the second RF signal.

2. The RF transceiver front-end device of claim 1, wherein:
    said first transformer circuit includes a first transformer that has a primary winding and a secondary winding, each of which has a dotted end and a non-dotted end opposite to said dotted end, said dotted end of said primary winding being coupled to said antenna for receiving the first RF signal therefrom, said non-dotted end of said secondary winding being used to receive an external variable first reference voltage;
    said first switch unit includes a first transistor coupled between said dotted end of said secondary winding and ground, said first transistor having a control terminal used to receive an external first control signal and a substrate terminal, and being operable to be conducting or non-conducting in response to the first control signal;

when said RF transceiver front-end device is in the receiving mode,
  said secondary winding of said first transformer generates the first induction signal at said dotted end thereof based further on the first reference voltage, which has a non-zero magnitude, and
  said first transistor of said first switch unit is non-conducting such that the first induction signal is transmitted to said LNA circuit from said dotted end of said secondary winding of said first transformer; and
when said RF transceiver front-end device is in the transmitting mode, said non-dotted end of said secondary winding of said first transformer is grounded because the magnitude of the first reference voltage becomes zero, and said first transistor of said first switch unit conducts.

3. The RF transceiver front-end device of claim 2, wherein said first switch unit further includes:
  a first resistor having opposite terminals, one of which is coupled to said control terminal of said first transistor, and the other one of which is used to receive the first control signal; and
  a second resistor coupled between said substrate terminal of said first transistor and ground.

4. The RF transceiver front-end device of claim 2, wherein:
said second transformer circuit includes a second transformer that has a primary winding and a secondary winding, said primary winding of said second transformer having a dotted end, a non-dotted end and an intermediate tap, said secondary winding of said second transformer having a dotted end that is electrically connected to said non-dotted end of said primary winding of said first transformer of said first transformer circuit, and a grounded non-dotted end;
said power amplifier circuit includes
  a second transistor having a first terminal that is used to receive an external bias voltage, a second terminal that is coupled to said intermediate tap of said primary winding of said second transformer of said second transformer circuit, and a control terminal that is used to receive an external second control signal such that said second transistor is operable to be conducting or non-conducting in response to the second control signal,
  a third transformer having a primary winding and a secondary winding, said primary winding of said third transformer having a dotted end that is coupled to said modulation circuit for receiving the modulated signal therefrom, and a grounded non-dotted end, said secondary winding of said third transformer having a dotted end, a non-dotted end, and an intermediate tap that is used to receive an external second reference voltage, said third transformer being operable to generate, based on the modulated signal and further on the second reference voltage, a positive phase induction signal and a negative phase induction signal respectively at said dotted and non-dotted ends of said secondary winding thereof, and
  a second switch unit having a first input end and a second input end that are coupled respectively to said dotted and non-dotted ends of said secondary winding of said third transformer for receiving the positive and negative phase induction signals respectively therefrom, and a first output end and a second output end that are coupled respectively to said dotted and non-dotted ends of said primary winding of said second transformer;

when said RF transceiver front-end device is in the receiving mode,
  said second transistor of said power amplifier circuit is non-conducting such that said intermediate tap of said primary winding of said second transformer of said second transformer circuit is floating, and
  said second switch unit of said power amplifier circuit is operable, based at least on the second reference voltage, in a low impedance state such that no current flows through said primary winding of said second transformer of said second transformer circuit; and
when said RF transceiver front-end device is in the transmitting mode,
  said second transistor of said power amplifier circuit conducts such that the bias voltage is applied to said intermediate tap of said primary winding of said second transformer of said second transformer circuit, and
  said second switch unit of said power amplifier circuit is operable, based at least on the positive and negative phase induction signals, in a high impedance state such that a positive phase output signal and a negative phase output signal are outputted respectively at said second and first output ends, the positive and negative phase output signals cooperatively constituting the amplified output, and
  said second transformer of said second transformer circuit generates, based on the positive and negative phase output signals and the bias voltage, the second induction signal at said dotted end of said secondary winding thereof.

5. The RF transceiver front-end device of claim 4, wherein said first transformer circuit further includes a capacitor that is coupled between said non-dotted end of said primary winding of said first transformer of said first transformer circuit and said dotted end of said secondary winding of said second transformer of said second transformer circuit.

6. The RF transceiver front-end device of claim 4, wherein said second switch unit includes:
  a series connection of a first resistor and a first capacitor coupled between said first input end and said first output end;
  a series connection of a second resistor and a second capacitor coupled between said second input end and said second output end;
  a third transistor electrically connected between said first output end and ground, said third transistor having a control terminal that is coupled to said first input end; and
  a fourth transistor electrically connected between said second output end and ground, said fourth transistor having a control terminal that is coupled to said second input end;
  wherein, when said second switch unit is in the low impedance state, said third and fourth transistors are each driven by the second reference voltage to operate in a linear region such that said first and second output ends are grounded; and
  wherein, when said second switch unit is in the high impedance state, said third and fourth transistors are driven respectively by the positive and negative phase induction signals to each operate in a saturation region such that the positive and negative phase output signals are outputted respectively at said second and first output ends.

7. The RF transceiver front-end device of claim 6, wherein said second switch unit further includes:

a fifth transistor coupled between said first output end and said third transistor, said fifth transistor having a control terminal used to receive an external third control signal such that said fifth transistor is operable to be conducting or non-conducting in response to the third control signal; and a sixth transistor coupled between said second output end and said fourth transistor, said sixth transistor having a control terminal used to receive the third control signal such that said sixth transistor is operable to be conducting or non-conducting in response to the third control signal;

wherein, when said second switch unit is in the low impedance state, said fifth and sixth transistors are each driven by the third control signal to operate in a linear region such that said first and second output ends are grounded; and wherein, when said second switch unit is in the high impedance state, said fifth and sixth transistors are driven by the third control signal to each operate in a saturation region, such that the positive and negative phase output signals are outputted respectively at said second and first output ends.

8. The RF transceiver front-end device of claim 2, wherein:
said second transformer circuit includes a second transformer that has a primary winding and a secondary winding, said primary winding of said second transformer having a dotted end and a non-dotted end, said secondary winding of said second transformer having a dotted end that is electrically connected to said non-dotted end of said primary winding of said first transformer of said first transformer circuit, and a grounded non-dotted end;
said power amplifier circuit includes
  a second transistor having a first terminal that is used to receive an external bias voltage, a second terminal, and a control terminal that is used to receive an external second control signal such that said second transistor is operable to be conducting or non-conducting in response to the second control signal,
  a third transformer having a primary winding and a secondary winding, said primary winding of said third transformer having a dotted end that is coupled to said modulation circuit for receiving the modulated signal therefrom, and a grounded non-dotted end, said secondary winding of said third transformer having a dotted end, a non-dotted end, and an intermediate tap used to receive an external second reference voltage, said third transformer being operable to generate, based on the modulated signal and further on the second reference voltage, a positive phase induction signal at said dotted end of said secondary winding thereof, and a negative phase induction signal at said non-dotted end of said secondary winding thereof, and
  a second switch unit having a first input end and a second input end that are coupled respectively to said dotted and non-dotted ends of said secondary winding of said third transformer for receiving the positive and negative phase induction signals respectively therefrom, a first output end and a second output end that are coupled respectively to said dotted and non-dotted ends of said primary winding of said second transformer, and a control end that is coupled to said second terminal of said second transistor of said power amplifier circuit;
  when said RF transceiver front-end device is in the receiving mode, for said power amplifier circuit,
    said second transistor is non-conducting such that said control end of said second switch unit is floating, and
    said second switch unit is operable, base at least on the second reference voltage, in a low impedance state such that no current flows through said primary winding of said second transformer of said second transformer circuit; and
  when said RF transceiver front-end device is in the transmitting mode, for said power amplifier circuit,
    said second transistor conducts such that the bias voltage is applied to said control end of said second switch unit,
    said second switch unit is operable, based at least on the positive and negative phase induction signals and the bias voltage, in a high impedance state such that a positive phase output signal and a negative phase output signal are outputted respectively at said second and first output ends, the positive and negative phase output signals cooperatively constituting the amplified output, and
    said second transformer of said second transformer circuit generates, based on the positive and negative phase output signals, the second induction signal at said dotted end of said secondary winding thereof.

9. The RF transceiver front-end device of claim 8, wherein said first transformer circuit further includes a capacitor that is coupled between said non-dotted end of said primary winding of said first transformer of said first transformer circuit and said dotted end of said secondary winding of said second transformer of said second transformer circuit.

10. The RF transceiver front-end device of claim 8, wherein said second switch unit includes:
  a series connection of a first resistor and a first capacitor coupled between said first input end and said first output end;
  a series connection of a second resistor and a second capacitor coupled between said second input end and said second output end;
  a third transistor coupled between said first output end of said second switch unit and ground, said third transistor having a control terminal that is coupled to said first input end;
  a fourth transistor coupled between said second output end of said second switch unit and ground, said fourth transistor having a control terminal that is coupled to said second input end;
  a fifth transistor coupled between said first output end and said control end of said second switch unit, said fifth transistor having a control terminal;
  a sixth transistor coupled between said second output end and said control end of said second switch unit, said sixth transistor having a control terminal;
  a third resistor having opposite terminals, one of which is coupled to said control terminal of said fifth transistor, and the other of which is used to receive an external third control signal such that the third control signal is transmitted to said control terminal of said fifth transistor through said third resistor;
  a fourth resistor having opposite terminals, one of which is coupled to said control terminal of said sixth transistor, and the other of which is used to receive the third control signal such that the third control signal is transmitted to said control terminal of said sixth transistor through said fourth resistor;

a third capacitor coupled between said control terminals of said third and fifth transistors; and
a fourth capacitor coupled between said control terminals of said fourth and sixth transistors;
wherein, when said second switch unit is in the low impedance state, said third and fourth transistors are driven by the second reference voltage to each operate in a linear region while said fifth and sixth transistors are driven by the third control signal to each operate in a linear region, such that said first and second output ends are grounded and no current flows through said secondary winding of said second transformer; and
wherein, when said second switch unit is in the high impedance state, said third and fourth transistors are driven respectively by the positive and negative phase induction signals to each operate in a saturation region while said fifth and sixth transistors are driven by the third control signal to each operate in a saturation region, such that the positive and negative phase output signals are outputted respectively at said second and first output ends.

11. The RF transceiver front-end device of claim 2, wherein:
said second transformer circuit includes a second transformer that has a primary winding and a secondary winding, said primary winding of said second transformer having a dotted end and a non-dotted end, said secondary winding of said second transformer having a dotted end that is electrically connected to said non-dotted end of said primary winding of said first transformer of said first transformer circuit, and a grounded non-dotted end;
said power amplifier circuit has an input end coupled to said modulation circuit for receiving the modulated signal therefrom, and a first output end and a second output end that are coupled respectively to said dotted and non-dotted ends of said primary winding of said second transformer, said power amplifier circuit including
a complementary metal-oxide-semiconductor (CMOS) circuit having an input node that is used to receive a second control signal, and an output node that is coupled to said first output end, said CMOS circuit being operable to generate an output voltage at said output node in response to the second control signal,
a series connection of a resistor and a capacitor coupled between said input end and said second output end, and
a second transistor and a third transistor coupled in series with each other and coupled respectively to said second output end and ground, said second transistor having a control terminal that is used to receive an external third control signal such that said second transistor is operable to be conducting or non-conducting in response to the third control signal, said third transistor having a control terminal that is coupled to said input end for receiving the modulated signal from said modulation circuit and that is used to further receive an external fourth control signal;
when said RF transceiver front-end device is in the receiving mode, said power amplifier circuit is operable, based on the second, third and fourth control signals, in a low impedance state, where the output voltage outputted at said output node of said CMOS circuit becomes zero in response to the second control signal while said second and third transistors are driven respectively by the third and fourth control signals to each operate in a linear region such that said first and second output ends are grounded, whereby no current flows through said primary winding of said second transformer of said second transformer circuit; and
when said RF transceiver front-end device is in the transmitting mode,
said power amplifier circuit is operable, based on the second and third control signals and the modulated signal, in a high impedance state, where the output voltage at said output node of said CMOS circuit becomes a bias voltage greater than zero in response to the second control signal such that the bias voltage is outputted at said first output end while said second and third transistors are driven respectively by the third control signal and the modulated signal to each operate in a saturation region, thereby the amplified output is outputted at said second output end, and
said second transformer of said second transformer circuit generates, based on the positive and negative phase output signals, the second induction signal at said dotted end of said secondary winding thereof.

12. The RF transceiver front-end device of claim 11, wherein said first transformer circuit further includes a capacitor that is coupled between said non-dotted end of said primary winding of said first transformer of said first transformer circuit and said dotted end of said secondary winding of said second transformer of said second transformer circuit.

13. The RF transceiver front-end device of claim 11, wherein said CMOS circuit includes:
a P-type metal-oxide-semiconductor field effect transistor (MOSFET) and an N-type MOSFET, each of which has a source, a drain and a gate, said gates of said P-type MOSFET and said N-type MOSFET being coupled to said input node, said drains of said P-type MOSFET and said N-type MOSFET being coupled to said output node, said source of said P-type MOSFET being used to receive the bias voltage, said source of said N-type MOSFET being grounded.

14. The RF transceiver front-end device of claim 1, wherein said first and second transformer circuits, said first switch unit, said LNA circuit, said demodulation and modulation circuits and said power amplifier circuit are integrated into a single chip.

* * * * *